United States Patent
Verma et al.

(10) Patent No.: US 12,282,527 B2
(45) Date of Patent: Apr. 22, 2025

(54) DETERMINING SYSTEM PERFORMANCE WITHOUT GROUND TRUTH

(71) Applicant: International Business Machines Corporation, Armonk, NY (US)

(72) Inventors: Dinesh C. Verma, New Castle, NY (US); Seraphin Bernard Calo, Cortlandt Manor, NY (US)

(73) Assignee: International Business Machines Corporation, Armonk, NY (US)

(*) Notice: Subject to any disclaimer, the term of this patent is extended or adjusted under 35 U.S.C. 154(b) by 1144 days.

(21) Appl. No.: 17/008,747

(22) Filed: Sep. 1, 2020

(65) Prior Publication Data

US 2022/0067450 A1  Mar. 3, 2022

(51) Int. Cl.
*G06F 18/21* (2023.01)
*G06F 18/214* (2023.01)
*G06N 20/00* (2019.01)

(52) U.S. Cl.
CPC ...... *G06F 18/2185* (2023.01); *G06F 18/2148* (2023.01); *G06N 20/00* (2019.01)

(58) Field of Classification Search
CPC .. G06N 20/00; G06F 18/2185; G06F 18/2148
See application file for complete search history.

(56) References Cited

U.S. PATENT DOCUMENTS

| | | | |
|---|---|---|---|
| 10,289,959 B2 | 5/2019 | Kakhandiki et al. | |
| 10,379,842 B2 | 8/2019 | Malladi et al. | |
| 10,671,938 B2 | 6/2020 | Hammond et al. | |
| 10,726,359 B1 | 7/2020 | Drouin et al. | |
| 2018/0330238 A1 | 11/2018 | Luciw et al. | |
| 2019/0138908 A1 | 5/2019 | Bernat et al. | |
| 2020/0042888 A1 | 2/2020 | Yu et al. | |
| 2020/0081445 A1 | 3/2020 | Stetson et al. | |
| 2020/0112609 A1 | 4/2020 | Hardman, III et al. | |
| 2020/0151558 A1 | 5/2020 | Ren et al. | |
| 2020/0167652 A1 | 5/2020 | Huang et al. | |
| 2020/0219014 A1 | 7/2020 | Verma et al. | |
| 2021/0397972 A1* | 12/2021 | Walters | G06N 3/047 |
| 2022/0012595 A1* | 1/2022 | David | G06N 3/086 |
| 2022/0013105 A1* | 1/2022 | Sharma | G10L 13/04 |

(Continued)

OTHER PUBLICATIONS

Papernot et al., "Practical Black-Box Attacks against Machine Learning," in Proc. 2017 ACM in Asia Conf. Computer and Comms. Security 506-19 (2017). (Year: 2017).*

(Continued)

*Primary Examiner* — Ryan C Vaughn
(74) *Attorney, Agent, or Firm* — Cantor Colburn LLP; Jared Chaney

(57) ABSTRACT

Techniques for determining system performance without ground truth include receiving a trained model and one or more generator models, the trained model having been trained on training data. The trained model is used on testing data to produce labeled testing data, and the labeled testing data are used to train a proxy model. The one or more generator models are used to produce synthetic training data that are representative of the training data. The proxy model is used on the synthetic training data to produce predictions, and performance of the trained model is determined based on the predictions by the proxy model.

20 Claims, 10 Drawing Sheets

(56) References Cited

U.S. PATENT DOCUMENTS

2022/0067570 A1\* 3/2022 Kong .................. G06V 20/46
2023/0169356 A1\* 6/2023 Banerjee ............... G06N 20/20
                                                        706/12

OTHER PUBLICATIONS

A. Baraldi, L. Bruzzone and P. Blonda, "Quality assessment of classification and cluster maps without ground truth knowledge," in IEEE Transactions on Geoscience and Remote Sensing, vol. 43, No. 4, pp. 857-873, Apr. 2005.
Balaji Lakshminarayanan, Yee Whye Teh (2013). Inferring ground truth from multi-annotator ordinal data: a probabilistic approach, arXiv preprint arXiv:1305.0015, 2013, 19 pages.
Bhaskaruni, D. et al., "Estimating Prediction Qualities without Ground Truth: A Revisit of the Reverse Testing Framework," Aug. 20-24, 2018, 2018 24th Interntional Conference on Pattern Recognition (ICPR), Beijing, China, downloaded on Aug. 17, 2020, 6 pages.
Carlotto, Mark J. (2009). Effect of errors in ground truth on classification accuracy, International Journal of Remote Sensing, vol. 30, No. 18, 2009, pp. 4831-4849(19).
Dutagaci, H., Cheung, C. P., & Godil, A. (2012). Evaluation of 3D interest point detection techniques via human-generated ground truth. The Visual Computer, 28(9), 901-917.
Fedorchuk, M. et al., "Statistic Metrics for Evaluation of Binary Classifiers without Ground-Truth," 2017 IEEE First Ukraine Conference on Electrical and Computer Engineering (UKRCON), downloaded Aug. 17, 2020, 6 pages.
Havens, K.A., et al., "Estimtaion of the Probability of Error Without Ground Truth nd Known a Priori Probabilities," IEEE Transactions on Geoscience Electronics, Jul. 1977, vol. 15, No. 3, pp. 147-152, 6 pages.
P. Du, Z. Sun, H. Chen, J. Cho and S. Xu, "Statistical Estimation of Malware Detection Metrics in the Absence of Ground Truth," in IEEE Transactions on Information Forensics and Security, vol. 13, No. 12, pp. 2965-2980, Dec. 2018.
Pratzlich, T., et al., "Triple-Based Analysis of Music Alignments Without the Need of Ground-Truth Annotations," ICASSP 2016, International Audio Laboratories Erlangen, 5 pages.
Richter S.R., Vineet V., Roth S., Koltun V. (2016) Playing for Data: Ground Truth from Computer Games. In: Leibe B., Matas J., Sebe N., Welling M. (eds) Computer Vision—ECCV 2016. ECCV 2016. Lecture Notes in Computer Science, vol. 9906. Springer, Cham, 16 pages.
Taylor, G. et al., "OVVV: Using Virtul Worlds to Design and Evaluate Surveillance Systems," 2007 IEEE, 8 pages.
Viinikka, J., Eggeling, R., & Koivisto, M. (Mar. 2018). Intersection-validation: A method for evaluating structure learning without ground truth. In International Conference on Artificial Intelligence and Statistics (pp. 1570-1578).
Wei Fan, Ian Davidson (2006), ReverseTesting: An Efficient Framework to Select Amongst Classifiers under Sample Selection Bias, KDD '06: Proceedings of the 12th ACM SIGKDD international conference on Knowledge discovery and data mining, Aug. 2006 pp. 147-156.
Yang, F., Du, M., & Hu, X. (2019). Evaluating explanation without ground truth in interpretable machine learning. arXiv preprint arXiv:1907.06831, 9 pages.
Deng, S. et al., Edge Intelligence: The Confluence of Edge Computing and Artificial Intelligence, Feb. 10, 2020, IEEE, 13 pages.
Wang, X. et al., "Convergence of Edge Computing and Deep Learning: A Comprehensive Survey," Jan. 28, 2020, To Be Appeared in IEEE Communications Surveys & Tutorials, 36 pages.
Wang, X. et al., "In-Edge AI: Intelligentizing Mobile Edge Computing, Caching and Communication by Federated Learning, " Jul. 19, 2019, IEEE Network Magazine, 10 pages.
Xu, D., et al., "Edge Intelligence: Architectures, Challenges, and Applications," Jun. 12, 2020, IEEE, 53 pages.
Zhang, D., et al., "EdgeBatch: Towards AI-empowered Optimal Task Batching in Intelligent Edge Systems," retrieved Aug. 3, 2020, National Science Foundation under Grant No. CNS-1845639, CNS-1831669, CBET-1637251, Army Research Office under Grant W911NF-17-1-0409, Google Fculty Research Award, 14 pages.

\* cited by examiner

GET A DATA POINT FROM THE GENERATOR

CREATING THE GENERATOR
(GIVEN DATA AND TRAINED MODEL)

GET A DATA POINT FROM THE GENERATOR MODEL

CREATING THE GENERATOR MODEL

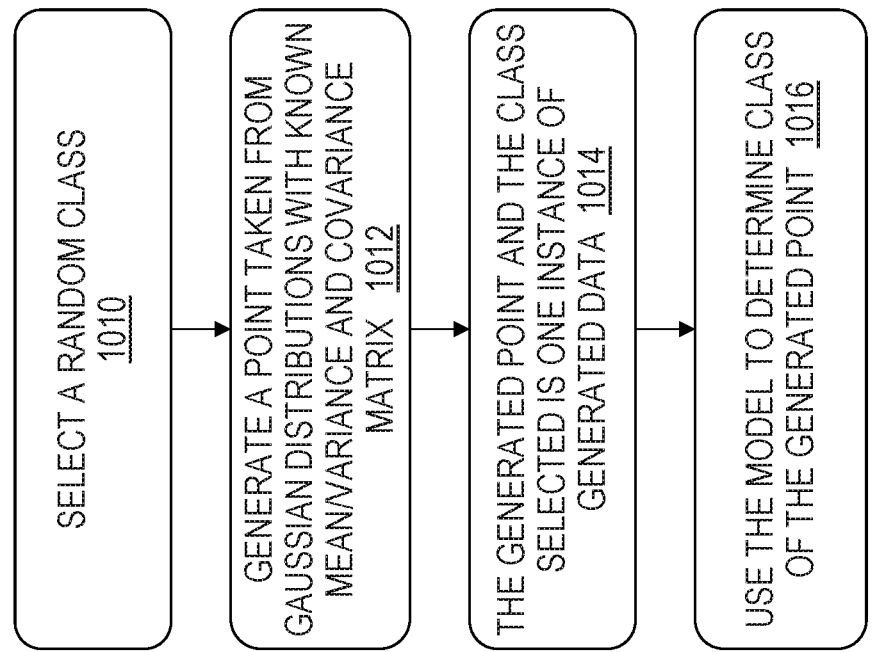
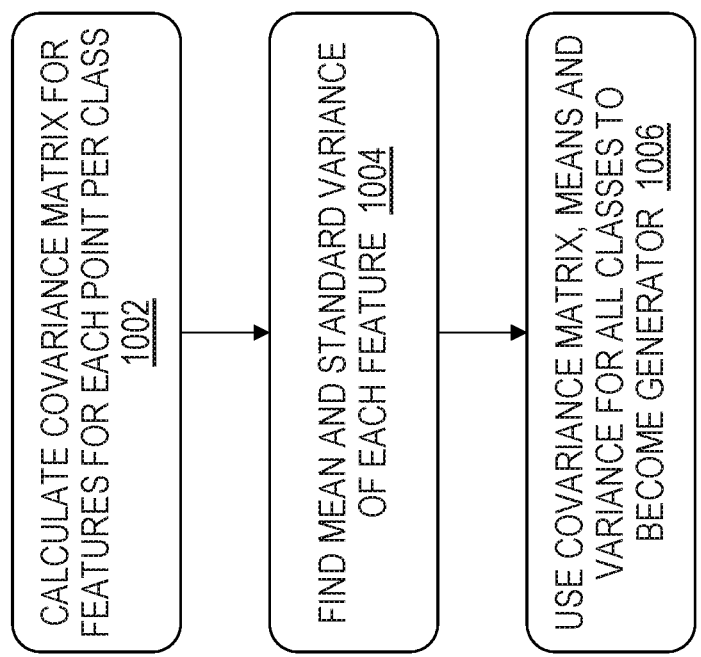

DETERMINING SYSTEM PERFORMANCE WITHOUT GROUND TRUTH

BACKGROUND

The present invention generally relates to computer systems, and more specifically, computer systems, computer-implemented methods, and computer program products for determining system performance without ground truth.

Machine learning (ML) uses computer algorithms that improve automatically through experience. Machine learning is seen as a subset of artificial intelligence. Machine learning algorithms build a mathematical model based on sample data, known as "training data", in order to make predictions or decisions without being explicitly programmed to do so. "Ground truth" is a term used in statistics and machine learning which means checking the results of machine learning for accuracy against the real world or data in the real world. The term implies a kind of reality check for machine learning algorithms. Further, ground truth is a term borrowed from meteorology for independent confirmation at a site for information obtained by remote sensing. Researchers in machine learning also employ a kind of ground truth by checking the classifications that machine learning algorithms make against what they know in reality. An example of ground truth in this context is checking the messages that a Bayesian spam filter has marked as spam for false positives by confirming that email messages are legitimate. These kinds of tests allow researchers to refine their algorithms, thereby making them more accurate.

In machine learning, any machine learning enabled operation has two steps which are training and inference. During training, the machine learning model is trained on training data, and the machine learning model can be represented in any number of model architectures. During inference, the trained model is provided test data and produces an output. Model performance is measured by metrics that calculate the difference between model output and what the true output or ground truth should be. However, it is a challenge to find an estimate for model performance when the true output or the ground truth for the testing data is not available.

SUMMARY

Embodiments of the present invention are directed to a computer-implemented method of performing determining system performance without ground truth. A non-limiting example computer-implemented method includes receiving a trained model and one or more generator models, the trained model having been trained on training data, the one or more generator models being configured to produce synthetic training data representative of the training data. The computer-implemented method includes using the trained model on testing data to produce labeled testing data and using, by a processor, the labeled testing data to train a proxy model. The computer-implemented method includes using, by the processor, the proxy model on the synthetic training data to produce predictions and determining, by the processor, performance of the trained model based on the predictions by the proxy model.

In addition to one or more of the features described above or below, or as an alternative, further embodiments of the invention could include determining the performance of the trained model based on the predictions by the proxy model which includes comparing the predictions of the proxy model to synthetic labels in the synthetic training data.

In addition to one or more of the features described above or below, or as an alternative, further embodiments of the invention could include determining the performance of the trained model based on the predictions by the proxy model which includes using a success rate of a comparison between the predictions of the proxy model and synthetic labels in the synthetic training data as a proxy for the performance of the trained model.

In addition to one or more of the features described above or below, or as an alternative, further embodiments of the invention could include that the predictions of the proxy model comprise predicted labels for the synthetic training data, further including determining a success rate of the proxy model by comparing the predicted labels to synthetic labels in the synthetic training data and attributing the success rate of the proxy model to the trained model.

In addition to one or more of the features described above or below, or as an alternative, further embodiments of the invention could include that the one or more generator models are configured to produce synthetic labels for the synthetic training data representative of original labels in the training data.

In addition to one or more of the features described above or below, or as an alternative, further embodiments of the invention could include that an edge node having the processor, the training data being remote from the edge node having the processor.

In addition to one or more of the features described above or below, or as an alternative, further embodiments of the invention could include that the testing data are captured at an edge node, the edge node being remote from the training data, the training data being inaccessible and not received by the processor at an edge node.

In addition to one or more of the features described above or below, or as an alternative, further embodiments of the invention could include that the one or more generator models comprise multiple generator models configured to produce multiple synthetic training data each being representative of the training data, further including using an intersection of the multiple synthetic training data as the synthetic training data.

In addition to one or more of the features described above or below, or as an alternative, further embodiments of the invention could include finding an estimate for model performance when the true output and/or the ground truth for testing data is not available.

Other embodiments of the invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 10A depicts an example block diagram of creating a generator model in accordance with one or more embodiments of the present invention; and FIG. 10B depicts an example block diagram of generating a data point from the generator model created in FIG. 10A in accordance with one or more embodiments of the present invention.

DETAILED DESCRIPTION

Figure 4:
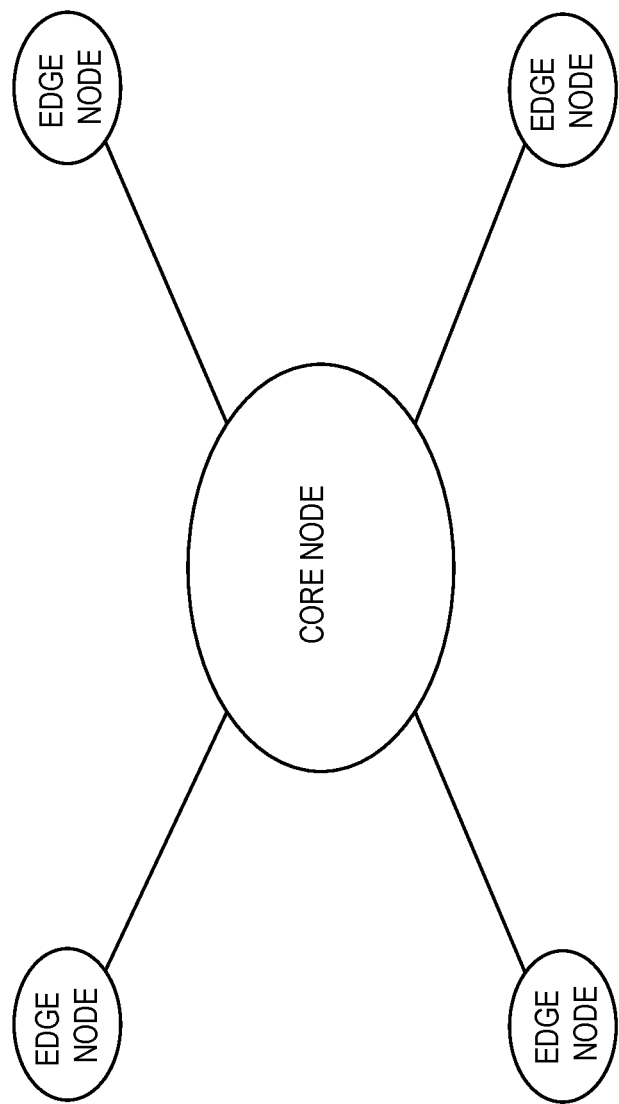
FIG. 4 depicts a block diagram of an example core node connected to different edge nodes in accordance with one or more embodiments of the present invention.

One or more embodiments of the present invention provide computer systems, computer-implemented methods, and computer program products configured and arranged to determine system performance without ground truth. One or more embodiments of the invention can assess the performance of an artificial intelligence model or model at an edge node where ground truth (data) and/or true output is not available. A core node can be connected to one or more edge nodes as depicted in FIG. 4. The core node trains a model on training data and creates at least one or more generators (i.e., generator models) of the training data at the core node. The core node sends the trained model and generator to the edge node, without sending the large training data. The trained model is applied to testing data captured or obtained at the edge node. The edge node uses the generator to recreate the training data, also called synthetic training data, at the edge node. The edge node uses the synthetic training data that have been regenerated and reverse testing to evaluate model performance of the trained model at the edge node, without using or requiring the original training data that remain stored at the core node. In one or more embodiments, the edge node can receive and use multiple generators to create multiple synthetic training datasets and choose an intersection of the synthetic training datasets as the synthetic training data ultimately used to evaluate model performance. Because all generators (or generator functions) are not equally good at regeneration and because some generators are more compact, the core node can send several generators to the edge node such that the edge node can use ensemble approaches to manage/address practical uncertainty.

In the state-of-the-art, it is a challenge to find an estimate for model performance at the edge node when the true output or the ground truth for the testing data is not available. Because the enormous size of training data prevents it from being carried to the edge node, one or more embodiments of the invention carry a summary of the training data as generators of the training data. This allows the generator to move representative data over to the edge node for reverse testing while not moving the large training data themselves, especially when the edge node has limited memory and/or bandwidth to receive the training data.

Figure 1:
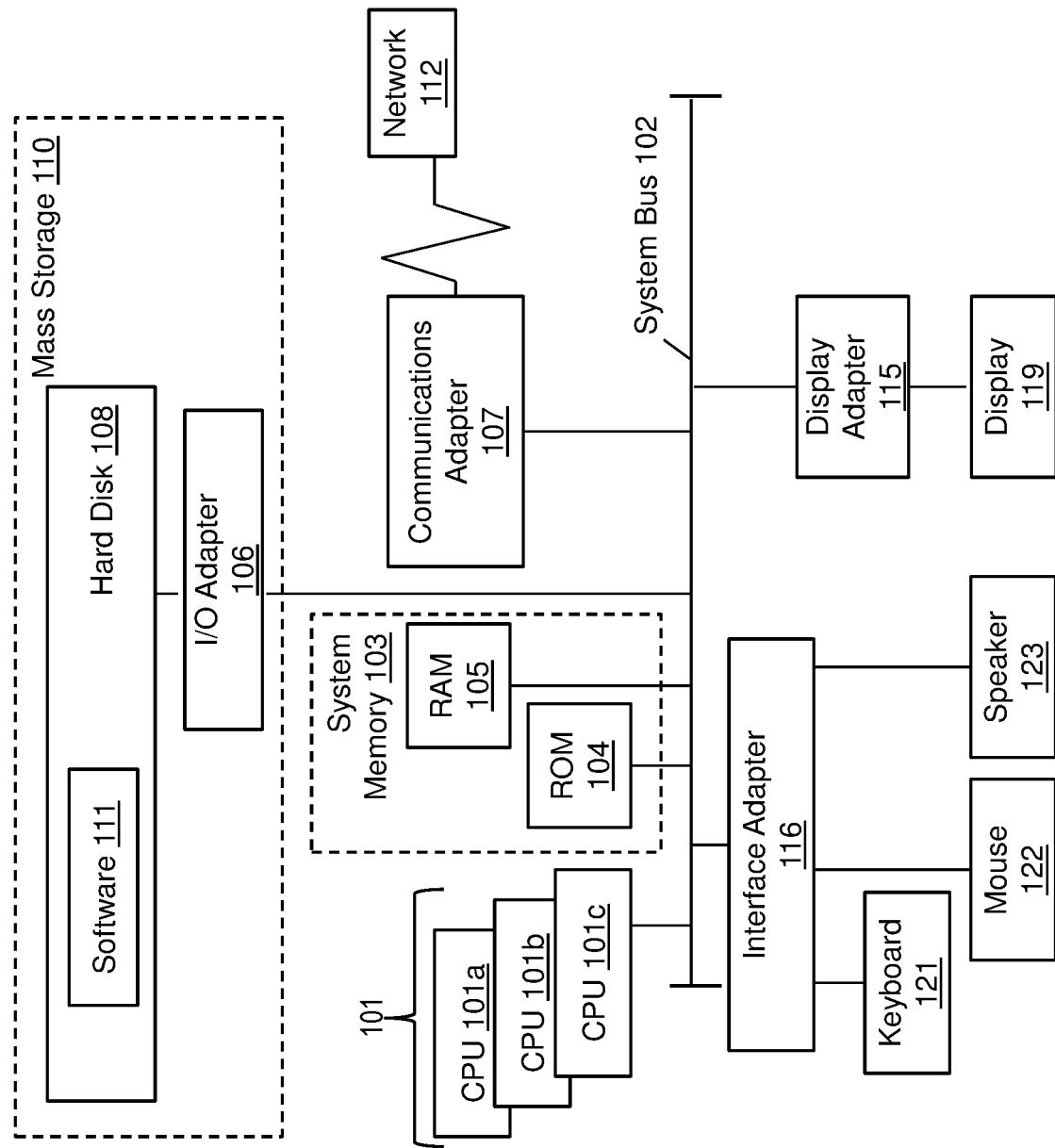
FIG. 1 depicts a block diagram of an example computer system for use in conjunction with one or more embodiments of the present invention.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be easily scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node. Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments of the invention, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments of the invention described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
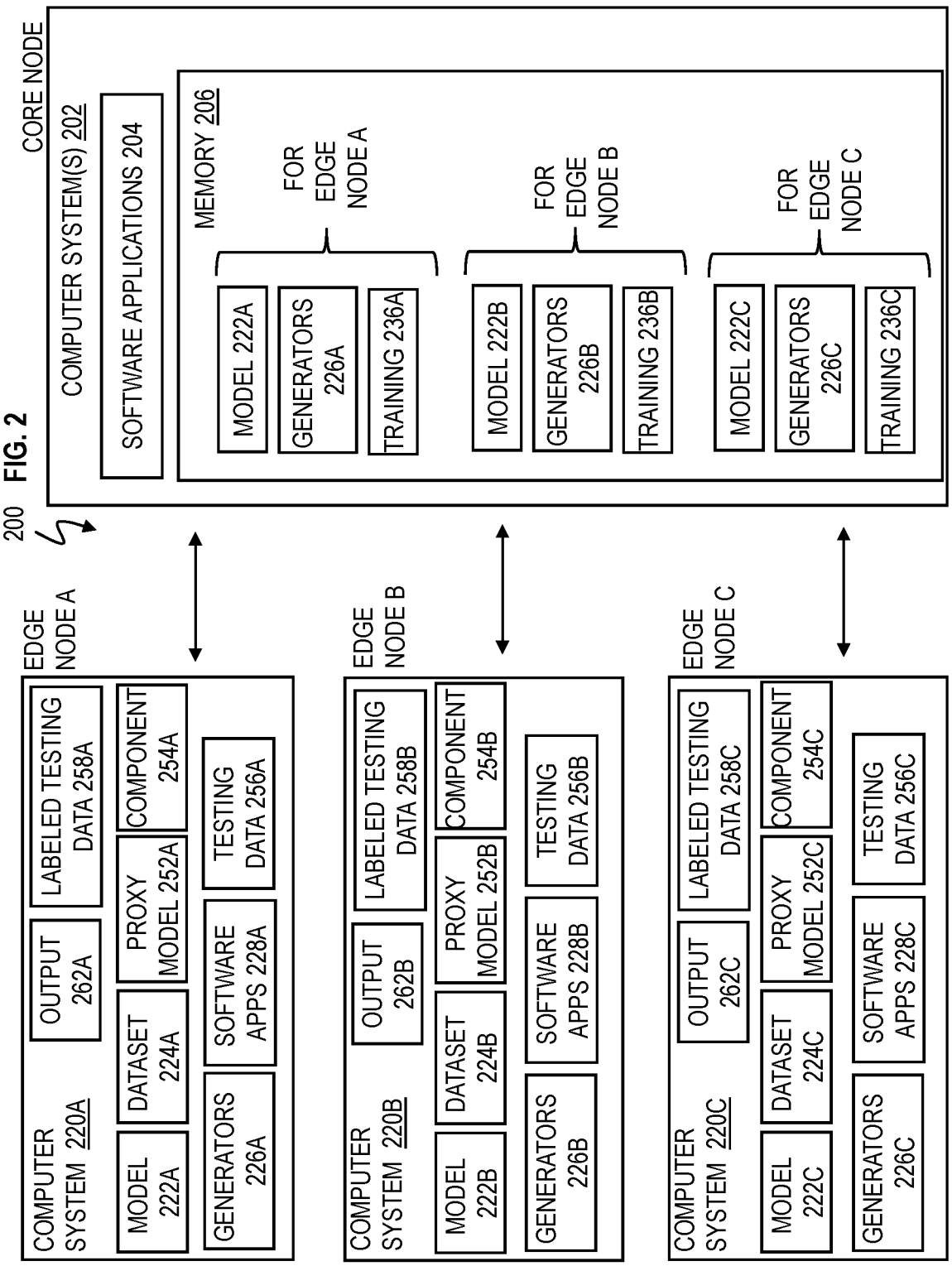
FIG. 2 depicts a block diagram of a system for determining model performance without ground truth in accordance with one or more embodiments of the present invention.
Figure 3:
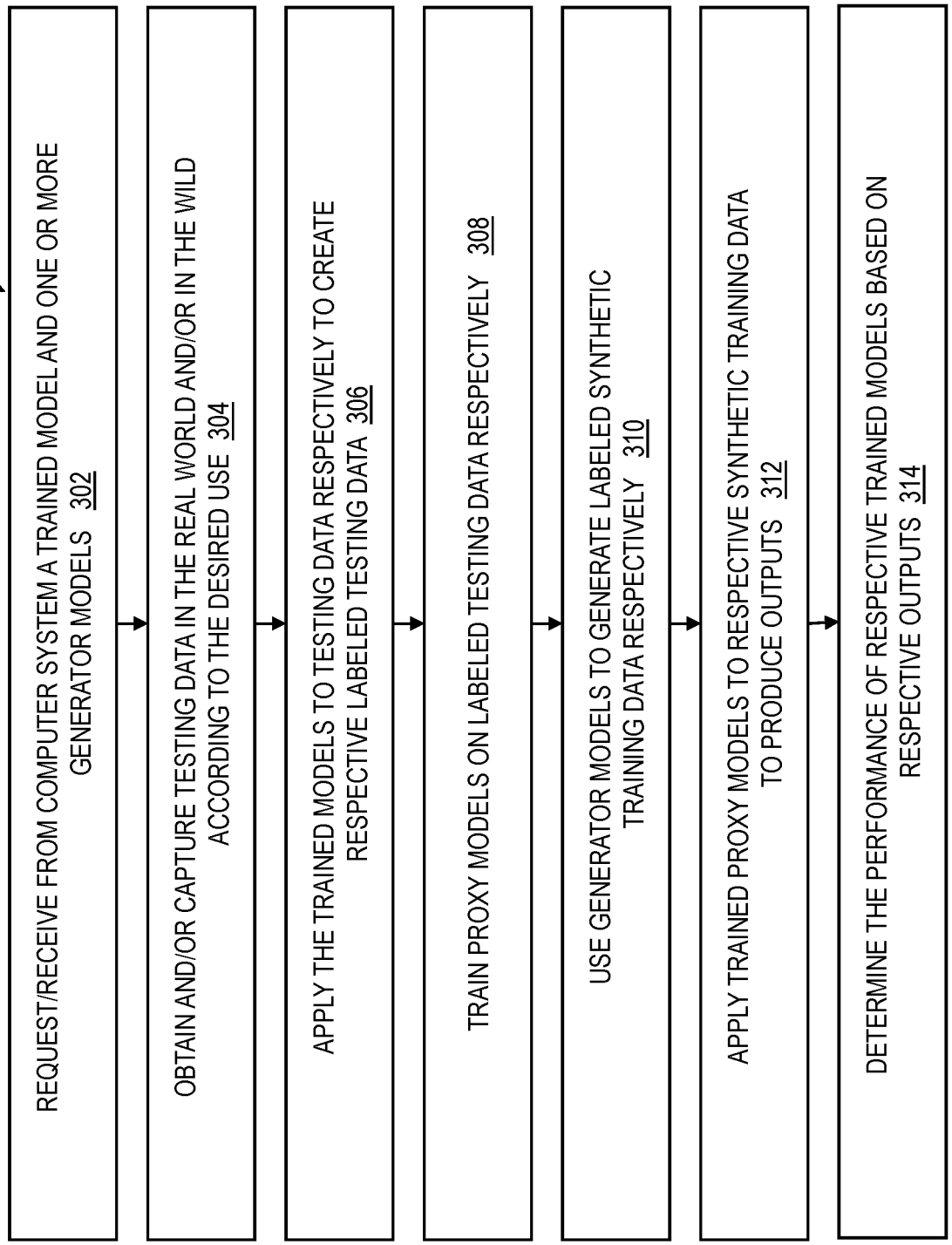
FIG. 3 depicts a flowchart of a process for determining model performance without ground truth in accordance with one or more embodiments of the present invention.

FIG. 2 is a block diagram of a system 200 for determining model performance of a trained model without ground truth in accordance with one or more embodiments of the present invention. FIG. 2 depicts one or more computer systems 202 at a core node coupled to various computer systems at different edge nodes. Example edge nodes coupled to a core node over a wire or wireless network is depicted in FIG. 4. In FIG. 2, the various computer systems include computer systems 220A at edge node A, computer systems 220B at edge node B, computer systems 220C at edge node C, and so forth. Each local edge node can be a location that uses its respective trained model on testing data in the real world or in the "wild." Computer systems 220A, 220B, 220C can be generally referred to as computer systems 220. Although three edge nodes A, B, C and three computer systems 220 are shown for illustration purposes, more or fewer than three edge nodes can be utilized, and more or fewer than three computer systems 220 can be coupled to computer system 202 at the core node. Computer systems 202 can be representative of numerous computers in datacenters. Computer systems 220 can be representative of numerous computers and/or devices which utilize reverse testing on trained models according to one or more embodiments of the invention. Elements including processor, memory, software applications, etc., of computer system 100 can be used in and/or integrated into computer systems 202 and computer systems 220 to implement the functionality and details discussed herein. FIG. 3 depicts a flowchart of a process 300 for determining model performance of a trained model without ground truth and/or true output in accordance with one or more embodiments of the present invention. Process 300 in FIG. 3 will be described below with reference to the process 300 shown in FIG. 3, along with elements depicted in FIG. 2. At block 302, software applications 228 on computer system 220 are configured to request and/or receive from computer system 202 a trained model and one or more generator models. For example, computer system 220A at edge node A requests and receives its own trained model 222A and generator models 226A from computer system 202 at core node. Similarly, computer system 220B at edge node B requests and receives its own trained model 222B and generator models 226B from computer system 202 at core node. Computer system 220C at edge node C requests and receives its own trained model 222C and generator models 226C from computer system 202 at core node. Trained models 222A, 222B, 222C can generally be referred to as trained models 222. Generator models 226A, 226B, 226C can generally be referred to as generator models 226. Trained models 222 and generator models 226 are stored in respective computer systems 220 at corresponding edge nodes A, B, C.

Computer system 202, for example, using software application 204, is configured to train each model 222A, 222B, 222C on its respective training data 236A, 236B, 236C, such that the trained models 222A, 222B, 222C can be sent to respective edge nodes A, B, C. Training data 236A, 236B, 236C are labeled data which are used for training. Labeled training data are a group of samples that have been tagged with one or more labels. Labeling typically takes a set of unlabeled data and augments each piece of that unlabeled data with meaningful tags that are informative. Computer system 202, for example, using software application 204, is configured to create one or more generator models 226A, 226B, 226C from training data 236A, 236B, 236C respectively. Generator models 226A are configured to regenerate training data 236A including the pieces of data (e.g., images, data points, etc.) and the associated labels (e.g., labels identifying each piece of data) as synthetic data. Similarly, generator models 226B are configured to regenerate training data 236B including the pieces of data (e.g., images, data points, etc.) and the associated labels (e.g., labels identifying each piece of data) as synthetic data. Likewise, generator models 226C are configured to regenerate training data 236C including the pieces of data (e.g., images, data points, etc.) and the associated labels (e.g., labels identifying each piece of data) as synthetic data.

One or more software applications 228 of computer systems 220 are configured to interface directly with software application 204 of computer system 202. Software applications 204 can be implemented as software 111 executed on one or more processors 101, as discussed in FIG. 1. Similarly, software application 228 can be implemented using software 111 configured to execute on one or more processors 101. Software application 228 can include and/or access application programming interfaces (APIs) to operate as discussed herein.

At block 304, software applications 228 on computer system 220 are configured to obtain and/or capture testing data in the real world and/or in the "wild" according to the desired use. Obtaining/capturing testing data in real world and/or in the wild relates to capturing the testing data under normal conditions. Computer systems 220A, 220B, 220C can each obtain and/or capture testing data 256A, 256B, 256C respectively. In one or more embodiments of the invention each node A, B, C can have its own components 254A, 254B, 254C for obtaining/capturing respective testing data 256A, 256B, 256C. Components 254A, 254B, 254C can generally be referred to as components 254, and testing data 256A, 256B, 256C can generally be referred to as testing data 256. Testing data 256 are unlabeled data. Components 254 can include software components and/or hardware components. Components 254 can include devices that are configured to capture, scan, image, listen to, read, etc., the testing data 256, so that the testing data 256 are available for processing by trained model 222. Components 254 can include cameras, microphones, scanners, etc., and components 254 can be coupled to and/or integrated with computer systems 220. At one edge node, components 254 can include a video camera that obtains images of a manufactured product, such that the trained model 222 can determine if the manufactured product is defective or not defective. For one edge node, components 254 can include a video camera and microphone at a bank, which obtain images of banknotes or checks such that the trained model 222 can determine if the banknotes or checks are genuine or counterfeit. The edge nodes are at the location of use, i.e., on site at the location in which the testing data are captured and are to be labeled/classified.

At block 306, software applications 228 on computer system 220 are configured to apply the trained models 222A, 222B, 222C to testing data 256A, 256B, 256C respectively to create respective labeled testing data 258A, 258C, 258C. No ground truth or true output is available and/or accessible to check the performance of trained models 222A, 222B, 222C at their respective edge nodes A, B, C. In one or more embodiments of the invention, each of software applications 228 is configured to perform reverse testing using synthetic training data as discussed further herein.

At block 308, software applications 228 on computer system 220 are configured to train proxy models 252A, 252B, 252C on labeled testing data 258A, 258B, 258C respectively. Accordingly, each of proxy models 252A, 252B, 252C has been trained using the predictions (i.e., labeled testing data 258A, 258B, 258C) of respective trained models 222A, 222B, 222C. Proxy models 252A, 252B, 252C have the same model architecture as their respective trained models 222A, 222B, 222C. For example, proxy model 252A has the same model architecture as its respective trained model 222A, proxy model 252B has the same model architecture as its respective trained model 222B, and proxy model 252C has the same model architecture as its respective trained model 222C.

At block 310, software applications 228 on computer system 220 are configured to use generator models 226A, 226B, 226C to generate labeled synthetic training data 224A, 224B, 224C respectively. For example, generator models 226A are configured to generate labeled synthetic training data 224A statistically representative of and/or equivalent to training data 236A previously used to train trained model 222A. Similarly, generator models 226B are configured to generate labeled synthetic training data 224B statistically representative of and/or equivalent to training data 236B previously used to train trained model 222B. Also, generator models 226C are configured to generate labeled synthetic training data 224C statistically representative of and/or equivalent to training data 236C previously used to train trained model 222C.

At block 312, software applications 228 on computer system 220 are configured to apply trained proxy models 252A, 252B, 252C to respective synthetic training data 224A, 224B, 224C to produce outputs 262A, 262B, 262C. Outputs 262A, 262B, 262C can generally be referred to as outputs 262. Each of outputs 262A, 262B, 262C has predicted labels for respective synthetic training data 224A, 224B, 224C.

At block 314, software applications 228 on computer system 220 are configured to determine the performance of respective trained models 222A, 222B, 222C based on respective outputs 262A, 262B, 262C. For example, software applications 228A on computer system 220A are configured to compare labels of pieces of data in labeled synthetic training data 224A to predicted labels for the same pieces of data in output 262A in order to determine a success rate of proxy model 252A. The success rate is the fraction or percentage of correctly predicted labels in output 262A agreeing with or matching the actual labels in labeled synthetic training data 224A for the same pieces of data. Similarly, software applications 228B on computer system 220B are configured to compare labels of pieces of data in labeled synthetic training data 224B to predicted labels for the same pieces of data in output 262B in order to determine a success rate of proxy model 252B. Also, software applications 228C on computer system 220C are configured to compare labels of pieces of data in labeled synthetic training data 224C to predicted labels for the same pieces of data in output 262C in order to determine a success rate of proxy model 252C.

The success rate (for example 70%, 80%, 90%, 95%, 98%, 100% success rate) of each proxy model 252A, 252B, 252C is attributed to the corresponding trained model 222A, 222B, 222C. Accordingly, if proxy model 252A, which has been trained on labeled testing data 258A generated by trained model 222A, is determined to have a certain success rate (e.g., 90% success rate), that same success rate is attributed to trained model 222A on testing data 256A. By using reverse testing, software applications 228 have estimated/determined model performance (i.e., success rate) of trained model 222A at the edge node A when the true output and/or the ground truth (or labels) for the testing data 256A is not available and when the training data 236A are not sent from computer system 202 to computer system 220A. Similarly, if proxy model 252B, which has been trained on labeled testing data 258B generated by trained model 222B, is determined to have a certain success rate (e.g., 92% success rate), that same success rate is attributed to trained model 222B on testing data 256B. By using reverse testing, software applications 228 have estimated/determined model performance (i.e., success rate) of trained model 222B at the edge node B when the true output or the ground truth (or labels) for the testing data 256B is not available and when the training data 236B are not sent from computer system 202 to computer system 220B. Likewise, if proxy model 252C, which has been trained on labeled testing data 258C generated by trained model 222C, is determined to have a certain success rate (e.g., 98% success rate), that same success rate is attributed to trained model 222C on testing data 256C. By using reverse testing, software applications 228 have estimated/determined model performance (e.g., success rate) of trained model 222C at the edge node C when the true output or the ground truth (or labels) for the testing data 256C is not available and when the training data 236C are not sent from computer system 202 to computer system 220C.

As noted herein, trained model 222 has the same model architecture as its corresponding proxy model 252. Model architectures include their associated machine learning algorithms to generate the desired type of model architecture. Examples of model architectures include but are not limited to linear regression, logistic regression, linear discriminant analysis, decision trees, Naive Bayes, k-nearest neighbors, learning vector quantization, support vector machines, bagging and random forest, deep neural networks, etc.

In one or more embodiments of the invention, the functionality of software applications 228 can be implemented by configuring and arranging the processing system 100 to execute machine learning algorithms. In general, machine learning algorithms, in effect, extract features from received data in order to "classify" the received data. Examples of suitable classifiers include but are not limited to neural networks, support vector machines, logistic regression, decision trees, hidden Markov Models (HMMs), etc. The result of the classifier's operations, i.e., the "classification," is to predict a class for the data. The machine learning algorithms apply machine learning techniques to the received data in order to, over time, create/train/update a unique "model" (e.g., trained model 222 and proxy model 252). The learning or training performed by the classifiers can be supervised, unsupervised, or a hybrid that includes aspects of supervised and unsupervised learning. Supervised learning is when training data are already available and classified/labeled. Unsupervised learning is when training data are not classified/labeled so must be developed through iterations of the classifier. Unsupervised learning can utilize additional learning/training methods including, for example, clustering, anomaly detection, neural networks, deep learning, and the like.

There are many technical benefits and advantages of determining model performance without using a true output and/or ground truth of the training data as discussed herein. A core node can train a model using labeled training data and create generator models configured to generate labeled synthetic training data that are representative of the training data. The core node has enormous resources compared to edge node including but not limited to an artificial intelligence (AI) accelerator which is a class of specialized hardware accelerators or computer systems designed to accelerate artificial intelligence applications. Reverse testing of the trained model is performed at the edge node which usually lacks the enormous resources of the core node, e.g., without the large memory capacity, large network/bandwidth capacity, AI accelerators, specialized processors, etc. As such, one or more embodiments of the invention perform reverse testing of the trained model at the edge node without using and/or requiring the large labeled training data to be received and stored at the edge node. Instead, the edge node creates labeled synthetic training data from generator models (e.g., a few kilobytes), which are much smaller in size than the original training data (e.g., hundreds or thousands of terabytes) used to train the trained model.

Figure 8B:
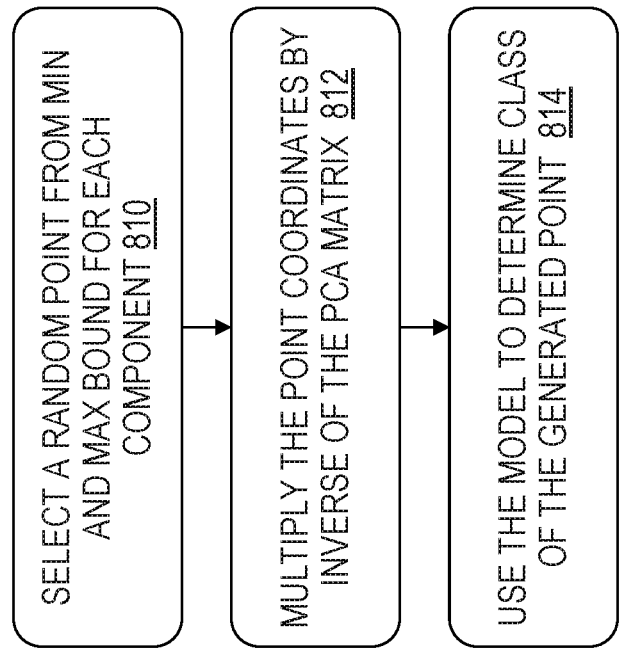
FIG. 8B depicts an example block diagram of generating a data point from the generator model created in FIG. 8A in accordance with one or more embodiments of the present invention.
Figure 8A:
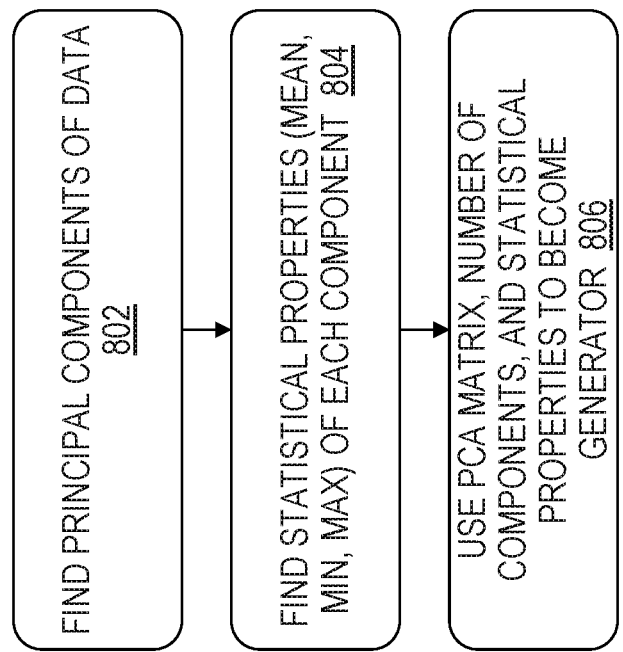
FIG. 8A depicts an example block diagram of creating a generator model in accordance with one or more embodiments of the present invention.

Now turning to further details regarding generator models as discussed below, there are various generator models that can be utilized in one or more embodiments of the invention. For data with features most common in the context of enterprises, a few different types of generator models are discussed below that can be utilized to represent and/or regenerate training data 236. As a first type of generator model, the generator model is configured to, on a per class basis, map all features (i.e., categorical attributes of the data) to their principal components. These principal components together with their maximum and minimum values form the generator model for a class. The computer system 202 (e.g., server) draws random samples from the principal components' minimum and maximum ranges of each feature. This generator model is received by the computer system 220 (e.g., at an edge node) as the minimum and maximum of each feature along with a principal component analysis (PCA) matrix. FIG. 8A depicts an example block diagram of creating the first type of generator model given data and the trained model in accordance with one or more embodiments of the invention. FIG. 8A is an example of a PCA based data generator. At block 802, one or more software applications 204 of computer system 202 are configured to find principal components of data (e.g., of training data 236A, 236B, 236C). At block 804, one or more software applications 204 of computer system 202 are configured to find statistical properties including mean, minimum, and maximum of each component. At block 806, one or more software applications 204 of computer system 202 are configured to form the generator model (e.g., generator models 226A, 226B, 226C respectively for each node A, B, C) using a PCA matrix of the principal components along with the number of components and statistical properties. FIG. 8B depicts an example block diagram of generating a data point from the generator model (e.g., generator models 226A, 226B, 226C respectively for each node A, B, C) created in FIG. 8A in accordance with one or more embodiments of the invention. Computer systems 220A, 220B, 220C at edge nodes A, B, C receive one or more respective generator models 226A, 226B, 226C from computer system 202 at the core node. At block 810, using the received generator model (e.g., generator models 226A, 226B, 226C), one or more software applications 228 of computer system 220 are configured to select/generate a random point from the minimum bound and maximum bound for each principal component. At block 812, one or more software applications 228 of computer system 220 are configured to multiply the coordinates of the random point by the inverse of the PCA matrix. At block 814, one or more software applications 228 of computer system 220 are configured to use the trained model (e.g., trained models 222A, 222B, 222C respectively received at each edge node A, B, C) to determine the class of the generated/selected random point. This process is continuously repeated thereby resulting in generation of synthetic training data 224A, 224B, 224C.

Figure 9B:
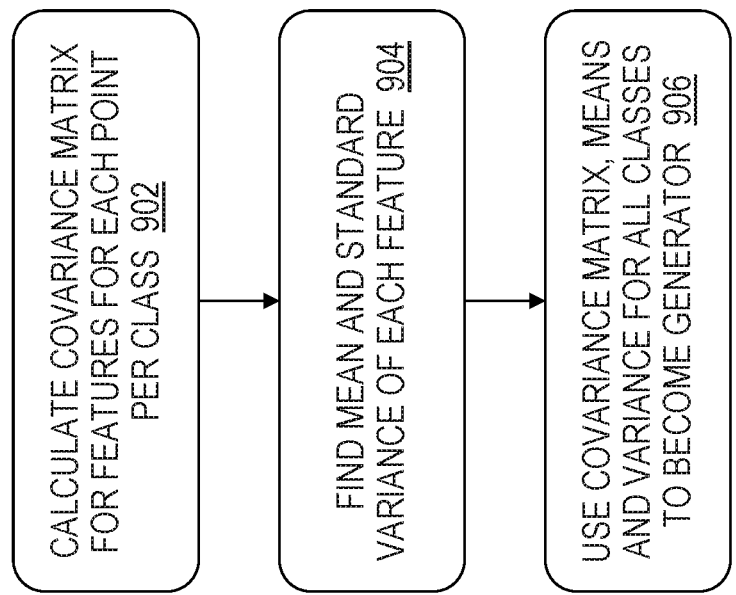
FIG. 9B depicts an example block diagram of generating a data point from the generator model created in FIG. 9A in accordance with one or more embodiments of the present invention.
Figure 9A:
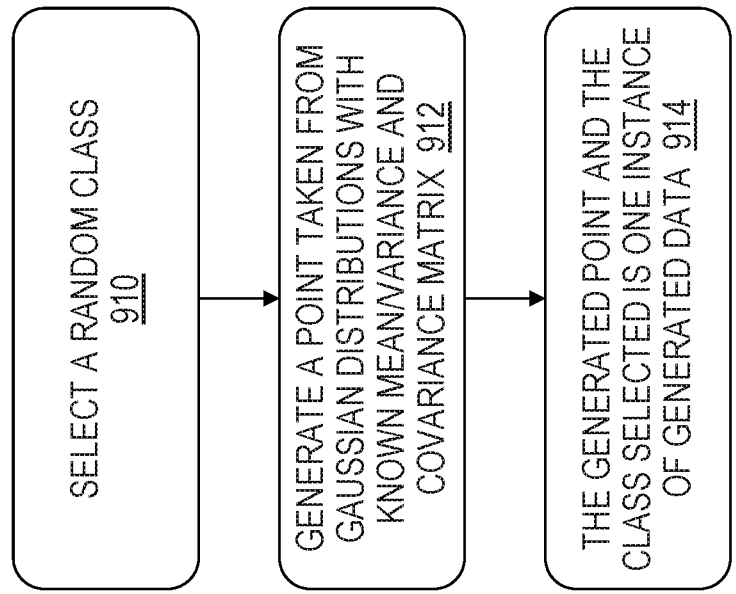
FIG. 9A depicts an example block diagram of creating of generator model in accordance with one or more embodiments of the present invention.

As a second type of generator model, the generator model is configured to, on a per class basis, determine the covariance matrix among all features and generate random normal distributions with mean and standard deviation of each feature. This generator model can be received by computer system 220 (e.g., at an edge node) as the covariance matrix along with the mean and standard deviation of each feature. FIG. 9A depicts an example block diagram of creating the second type of generator model in accordance with one or more embodiments of the invention. FIG. 9A is an example of a covariance based data generator. At block 902, one or more software applications 204 of computer system 202 are configured to calculate a covariance matrix for features (e.g., of training data 236A, 236B, 236C) for each point per class. At block 904, one or more software applications 204 of computer system 202 are configured to find the mean and standard deviation of each feature. At block 906, one or more software applications 204 of computer system 202 are configured to form the generator model (e.g., generator models 226A, 226B, 226C respectively for each node A, B, C) using the covariance matrix along with the means and variances for all classes. FIG. 9B depicts an example block diagram of generating a data point from the generator model created in FIG. 9A in accordance with one or more embodiments of the invention. Computer systems 220A, 220B, 220C at edge nodes A, B, C receive one or more respective generator models 226A, 226B, 226C from computer system 202 at the core node. At block 910, using the received generator model (e.g., generator models 226A, 226B, 226C), one or more software applications 228 of computer system 220 are configured to select a random class. At block 912, one or more software applications 228 of computer system 220 are configured to generate a point taken from gaussian distributions with known mean, known variance, and the covariance matrix. At block 914, one or more software applications 228 of computer system 220 are configured to use the generated point and the class selected as one instance of generated data. This process is continuously repeated thereby resulting in generation of synthetic training data 224A, 224B, 224C.

As a third type of generator model, the generator model is configured to use per class generated data but relabels each point using the trained model instead of using the generated data themselves. FIG. 10A depicts an example block diagram of creating the third type of generator model in accordance with one or more embodiments of the invention. This is an example of a covariance based data generator with relabeling. As will be seen, FIG. 10A is similar to FIG. 9A. At block 1002, one or more software applications 204 of computer system 202 are configured to calculate a covariance matrix for features (e.g., of training data 236A, 236B, 236C) for each point per class. At block 1004, one or more software applications 204 of computer system 202 are configured to find the mean and standard deviation of each feature. At block 1006, one or more software applications 204 of computer system 202 are configured to form the generator model (e.g., generator models 226A, 226B, 226C respectively for each node A, B, C) using the covariance matrix along with the means and variances for all classes. FIG. 10B depicts an example block diagram of generating a data point from the generator model created in FIG. 10A in accordance with one or more embodiments of the invention. Computer systems 220A, 220B, 220C at edge nodes A, B, C receive one or more respective generator models 226A, 226B, 226C from computer system 202 at the core node. Some blocks of FIG. 10B are similar to FIG. 9B. At block 1010, using the received generator model (e.g., generator models 226A, 226B, 226C), one or more software applications 228 of computer system 220 are configured to select a random class. At block 1012, one or more software applications 228 of computer system 220 are configured to generate a point taken from gaussian distributions with known mean, known variance, and the covariance matrix. At block 1014, one or more software applications 228 of computer system 220 are configured to use the generated point and the class selected as once instance of generated data. At block 1016 (unlike FIG. 9B), one or more software applications 228 of computer system 220 are configured to use the trained model (e.g., trained models 222A, 222B, 222C) to determine the class of the generated point. This process is continuously repeated thereby resulting in generation of synthetic training data 224A, 224B, 224C.

As noted above, given that generator models are expressed succinctly, computer system 220 can receive and store multiple generator models and use all the generated datasets (i.e., synthetic data) to validate performance in reverse testing. The following are specific examples of generator models which include but are not limited to PCA based characterization, per-class PCA, statistical generation, core sets with centroid and regeneration, generative adversarial networks (GANs), auto-encoder with distribution, a probabilistic context-free grammar (PCFG) that can generate samples, etc.

Figure 5:
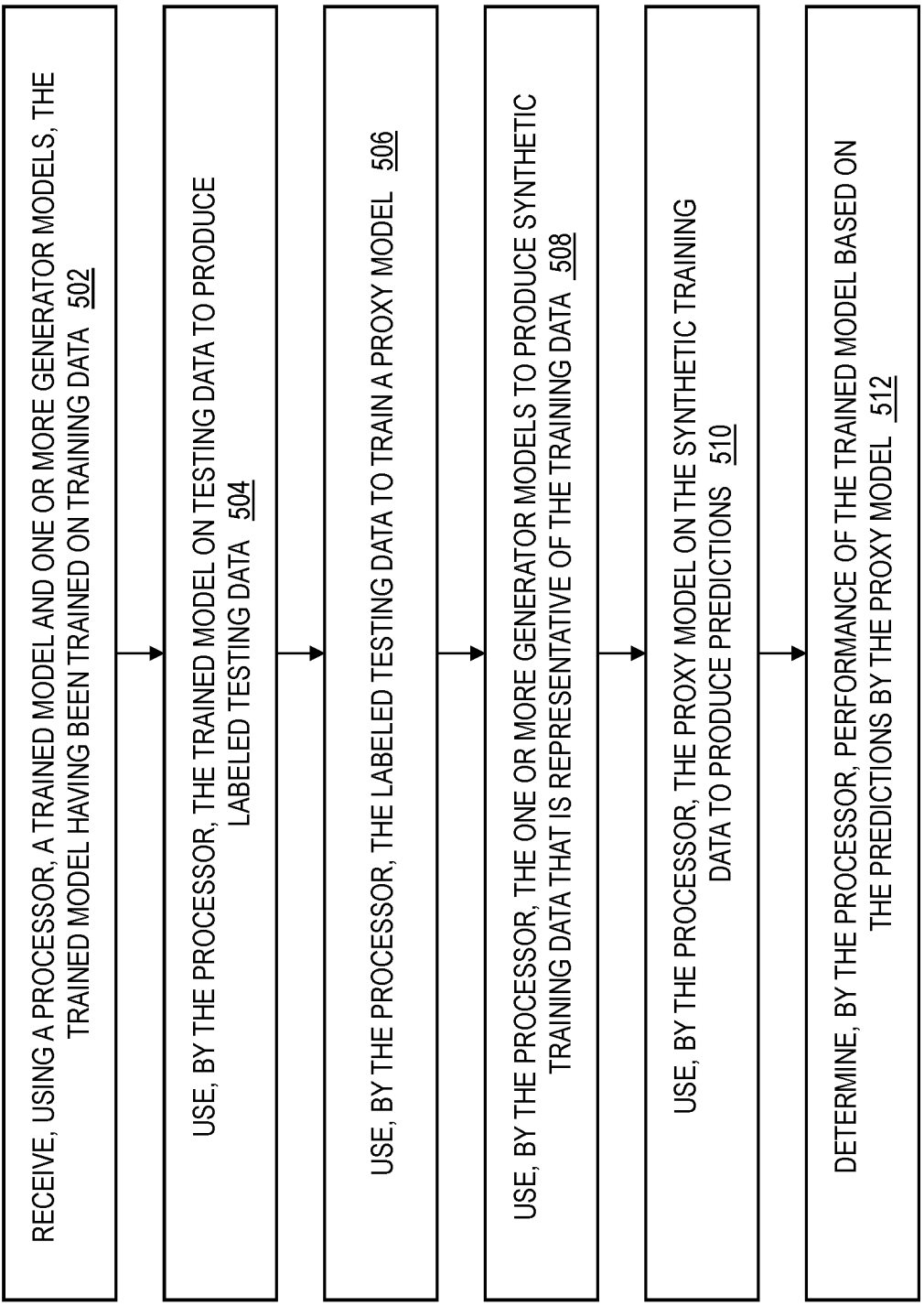
FIG. 5 depicts a flowchart of a computer-implemented method for determining model performance without the true output and/or ground truth, and more particularly, using reverse testing without having the original labeled testing data in accordance with one or more embodiments of the present invention.

FIG. 5 is a flowchart of a computer-implemented method 500 for determining model performance without the true output and/or ground truth, and more particularly, using reverse testing without having the original testing data in accordance with one or more embodiments of the present invention. At block 502, software application 228 of computer system 220 is configured to receive a trained model 222 and one or more generator models 226, the trained model 222 having been trained on training data 236 prior to being received by computer system 220. At block 504, software application 228 of computer system 220 is configured to use the trained model 222 on testing data 256 to produce labeled testing data 258. At block 506, software application 228 of computer system 220 is configured to use the labeled testing data 258 to train a proxy model 252. At block 508, software application 228 of computer system 220 is configured to use the one or more generator models 226 to produce synthetic training data 224 that are representative of the training data 236. At block 510, software application 228 of computer system 220 is configured to use the proxy model 252 on the synthetic training data 224 to produce predictions. At block 512, software application 228 of computer system 220 is configured to determine performance of the trained model 222 based on the predictions by the proxy model 252.

Determining the performance of the trained model 222 based on the predictions by the proxy model 252 includes comparing the predictions of the proxy model 252 to synthetic labels in the synthetic training data 224. Determining the performance of the trained model 222 based on the predictions by the proxy model 252 includes using a success rate of a comparison between the predictions of the proxy model 252 and synthetic labels in the synthetic training data 224 as a proxy for the performance of the trained model 222.

The predictions of the proxy model 252 include predicted labels for or assigned to the synthetic training data 224, and computer system 220 is further configured to determine a success rate of the proxy model 252 by comparing the predicted labels to synthetic labels in the synthetic training data 224, and attributing the success rate of the proxy model 252 to the trained model 222. The one or more generator models 226 are configured to produce synthetic labels for the synthetic training data 224 representative of original labels in the training data 236.

An edge node (e.g., any of edge nodes A, B, C) includes the processor (e.g., one or more processors likes processors 101), the training data 236 being remote from the edge node (e.g., any of edge nodes A, B, C) having the processor (e.g., one or more processors likes processors 101). The testing data 256 are captured at an edge node (e.g., any of edge nodes A, B, C), the edge node being remote from the training data 236, the training data 236 being inaccessible and not received by the processor at an edge node (e.g., any of edge nodes A, B, C). The one or more generator models 226 include multiple generator models configured to produce multiple synthetic training data each being representative of the training data 236, and computer system 220 is further configured to use an intersection of the multiple synthetic training data as the synthetic training data.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
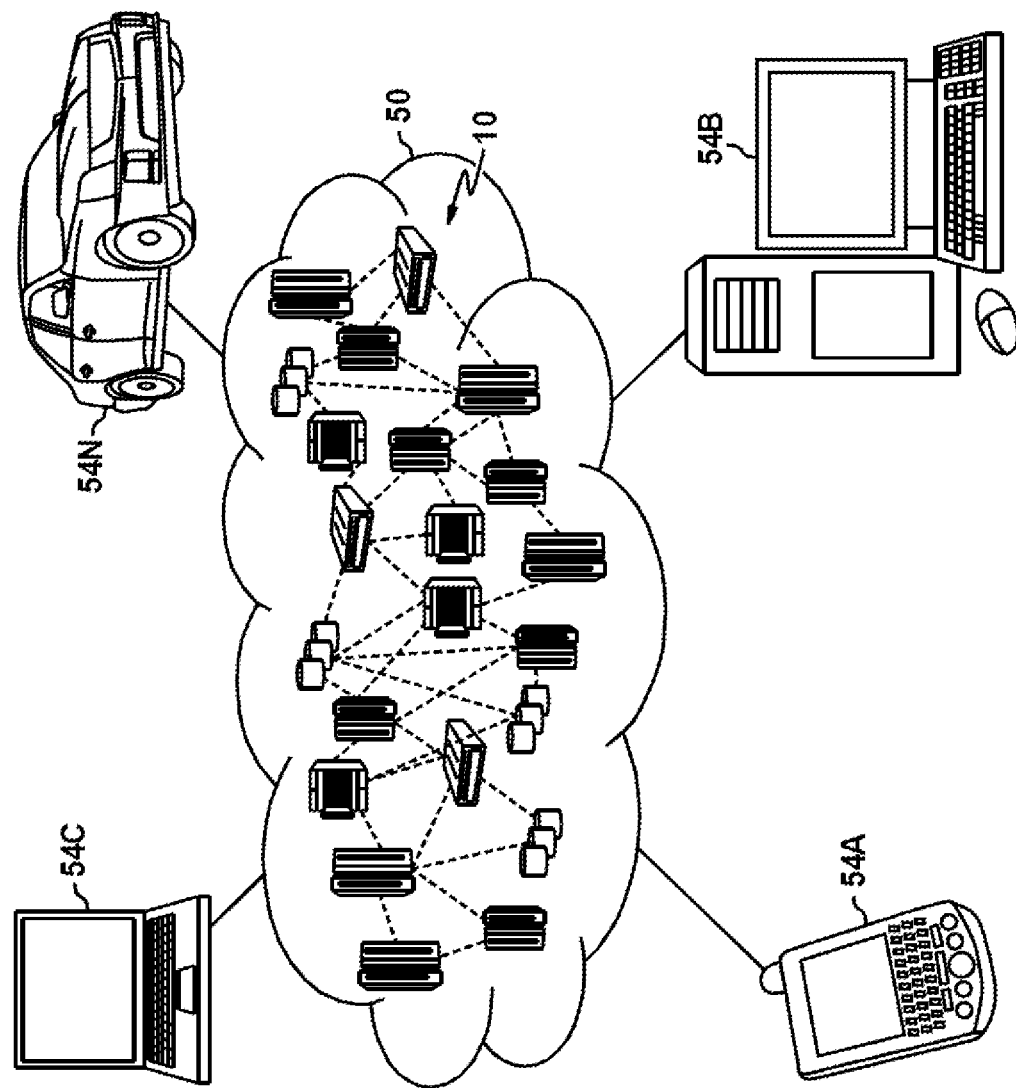
FIG. 6 depicts a cloud computing environment according to one or more embodiments of the present invention.

Referring now to FIG. 6, illustrative cloud computing environment 50 is depicted. As shown, cloud computing environment 50 includes one or more cloud computing nodes 10 with which local computing devices used by cloud consumers, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
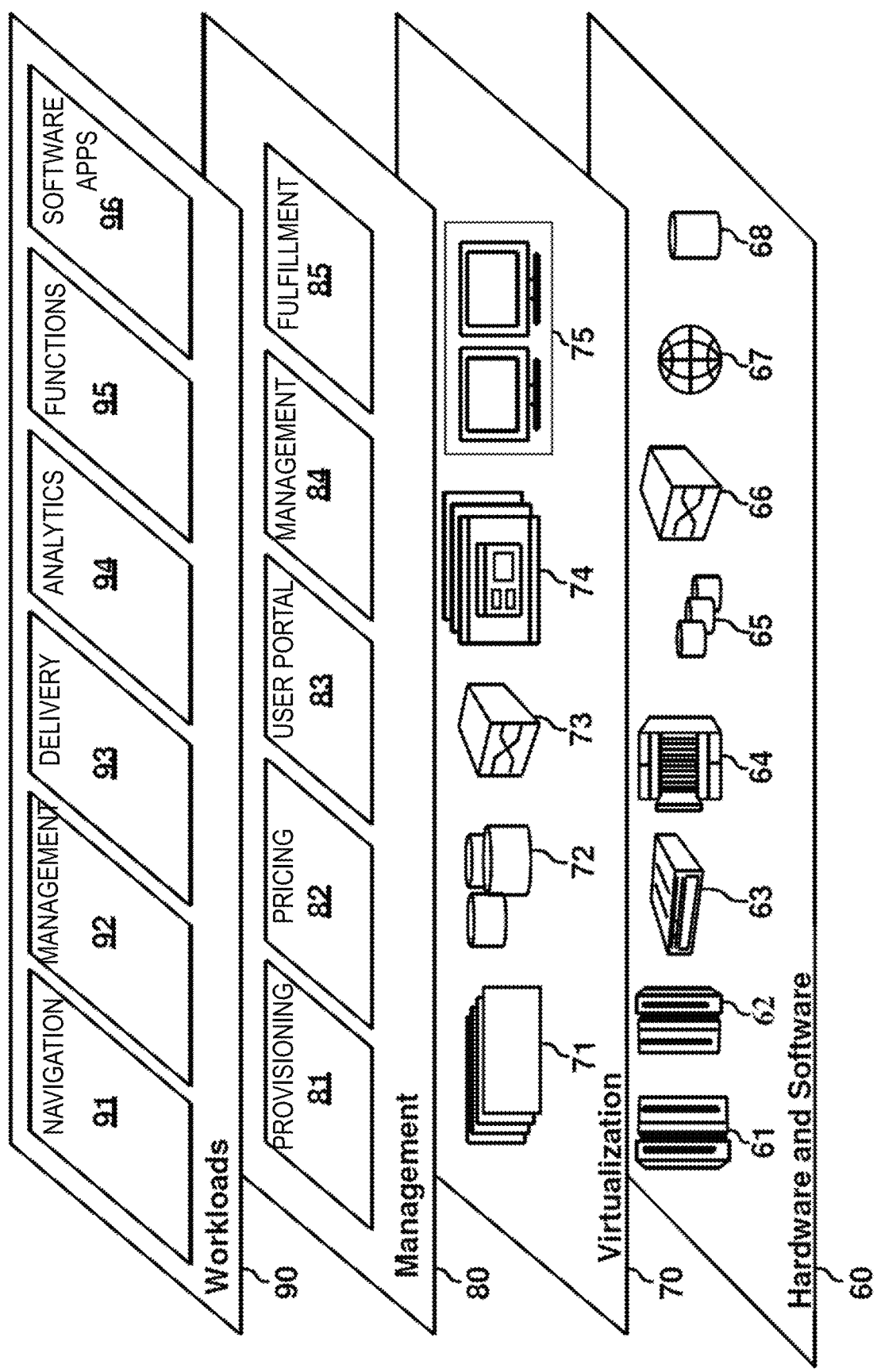
FIG. 7 depicts abstraction model layers according to one or more embodiments of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications implemented in workloads and functions 96 (e.g., executing software applications 204 and software applications 228 along with training/executing trained models 222, creating/using generator models 226, and training/executing proxy models 252). Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of +8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
   requesting, by an edge node of a plurality of edge nodes, both a trained model and one or more generator models from a core node coupled to the plurality of edge nodes;
   receiving, by the edge node, both the trained model and the one or more generator models from the core node coupled to the plurality of edge nodes, the trained model having been trained on training data at the core node, the one or more generator models being configured to produce synthetic training data representative of the training data and having been created at the core node, wherein the edge node receives both the trained model and the one or more generator models from the core node in response to the requesting the trained model and the one or more generator models;
   executing the edge node in a real-world environment to capture testing data, wherein the executing the edge node in the real-world environment to capture the testing data comprises employing components to capture the testing data under operating conditions;
   inputting, by the edge node, the testing data to the trained model to produce labeled testing data, wherein the edge node comprises a proxy model distinct from the trained model and the one or more generator models, wherein the trained model, the one or more generator models, and the proxy model are machine learning models;
   training, by the edge node, the proxy model with the labeled testing data, the proxy model having a machine learning architecture corresponding to the trained model; and
   inputting, by the edge node, the synthetic training data to the proxy model to produce predictions related to a performance of the trained model.

2. The computer-implemented method of claim 1, wherein the performance of the trained model is based on comparing the predictions of the proxy model to synthetic labels in the synthetic training data.

3. The computer-implemented method of claim 1, wherein the performance of the trained model is based on using a success rate of a comparison between the predictions of the proxy model and synthetic labels in the synthetic training data as a proxy for the performance of the trained model.

4. The computer-implemented method of claim 1, wherein the predictions of the proxy model comprise predicted labels for the synthetic training data, further comprising:
   determining a success rate of the proxy model by comparing the predicted labels to synthetic labels in the synthetic training data; and
   attributing the success rate of the proxy model to the trained model.

5. The computer-implemented method of claim 1, wherein the one or more generator models are configured to produce synthetic labels for the synthetic training data representative of original labels in the training data.

6. The computer-implemented method of claim 1, wherein the training data are remote from the edge node having the processor.

7. The computer-implemented method of claim 1, wherein the testing data are captured at the edge node, the edge node being remote from the training data, the training data being inaccessible and not received by the processor at the edge node.

8. The computer-implemented method of claim 1, wherein the one or more generator models comprise multiple generator models configured to produce multiple synthetic training data each being representative of the training data, further comprising:
   using an intersection of the multiple synthetic training data as the synthetic training data.

9. A system comprising:
   a memory having computer readable instructions; and
   one or more processors of an edge node for executing the computer readable instructions, the computer readable instructions controlling the one or more processors to perform operations comprising:
   requesting, by edge node of a plurality of edge nodes, both a trained model and one or more generator models from a core node coupled to the plurality of edge nodes;
   receiving, by the edge node, both the trained model and the one or more generator models from the core node coupled to the plurality of edge nodes, the trained model having been trained on training data at the core node, the one or more generator models being configured to produce synthetic training data that are representative of the training data and having been created at the core node, wherein the edge node receives both the trained model and the one or more generator models from the core node in response to the requesting the trained model and the one or more generator models;
   executing the edge node in a real-world environment to capture testing data, wherein the executing the edge node in the real-world environment to capture the testing data comprises employing components to capture the testing data under operating conditions;

inputting, by the edge node, testing data to the trained model to produce labeled testing data, wherein the edge node comprises a proxy model distinct from the trained model and the one or more generator models, wherein the trained model, the one or more generator models, and the proxy model are machine learning models;

training, by the edge node, the proxy model with the labeled testing data, the proxy model having a machine learning architecture corresponding to the trained model; and inputting, by the edge node, the synthetic training data to the proxy model to produce predictions related to a performance of the trained model.

10. The system of claim 9, wherein the performance of the trained model is based on comparing the predictions of the proxy model to synthetic labels in the synthetic training data.

11. The system of claim 9, wherein the performance of the trained model is based on using a success rate of a comparison between the predictions of the proxy model and synthetic labels in the synthetic training data as a proxy for the performance of the trained model.

12. The system of claim 9, wherein the predictions of the proxy model comprise predicted labels for the synthetic training data, further comprising:

determining a success rate of the proxy model by comparing the predicted labels to synthetic labels in the synthetic training data; and attributing the success rate of the proxy model to the trained model.

13. The system of claim 9, wherein the one or more generator models are configured to produce synthetic labels for the synthetic training data representative of original labels in the training data.

14. The system of claim 9, wherein the training data are remote from the edge node.

15. The system of claim 9, wherein the testing data is are captured at the edge node, the edge node being remote from the training data, the training data being inaccessible and not received by the one or more processors at the edge node.

16. The system of claim 9, wherein the one or more generator models comprise multiple generator models configured to produce multiple synthetic training data each being representative of the training data, further comprising:

using an intersection of the multiple synthetic training data as the synthetic training data.

17. A computer program product comprising a computer readable storage medium having program instructions embodied therewith, the program instructions executable by a processor of an edge node to cause the edge node to perform operations comprising:

requesting, by the edge node, both a trained model and one or more generator models from a core node coupled to the plurality of edge nodes;

receiving, by the edge node, both the trained model and the one or more generator models from the core node coupled to the plurality of edge nodes, the trained model having been trained on training data at the core node, the one or more generator models being configured to produce synthetic training data that are representative of the training data and having been created at the core node, wherein the edge node receives both the trained model and the one or more generator models from the core node in response to the requesting the trained model and the one or more generator models;

executing the edge node in a real-world environment to capture testing data, wherein the executing the edge node in the real-world environment to capture the testing data comprises employing components to capture the testing data under operating conditions;

inputting, by the edge node, testing data to the trained model to produce labeled testing data, wherein the edge node comprises a proxy model distinct from the trained model and the one or more generator models, wherein the trained model, the one or more generator models, and the proxy model are machine learning models;

training, by the edge node, the proxy model with the labeled testing data, the proxy model having a machine learning architecture corresponding to the trained model; and inputting, by the edge node, the synthetic training data to the proxy model to produce predictions related to a performance of the trained model.

18. The computer program product of claim 17, wherein the performance of the trained model is based on comparing the predictions of the proxy model to synthetic labels in the synthetic training data.

19. The computer program product of claim 17, wherein the performance of the trained model is based on using a success rate of a comparison between the predictions of the proxy model and synthetic labels in the synthetic training data as a proxy for the performance of the trained model.

20. The computer program product of claim 17, wherein the predictions of the proxy model comprise predicted labels for the synthetic training data, further comprising:

determining a success rate of the proxy model by comparing the predicted labels to synthetic labels in the synthetic training data; and attributing the success rate of the proxy model to the trained model.

* * * * *